(12) United States Patent
Xiao

(10) Patent No.: US 12,210,892 B2
(45) Date of Patent: Jan. 28, 2025

(54) METHOD FOR IMPLEMENTING SMART CONTRACT BASED ON BLOCKCHAIN

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 872 days.

(21) Appl. No.: 17/348,979

(22) Filed: Jun. 16, 2021

(65) Prior Publication Data

US 2021/0311770 A1 Oct. 7, 2021

(30) Foreign Application Priority Data

Jul. 15, 2020 (CN) .......................... 202010677698.6

(51) Int. Cl.
*G06F 9/455* (2018.01)
*G06F 9/50* (2006.01)

(52) U.S. Cl.
CPC ........ *G06F 9/45558* (2013.01); *G06F 9/5016* (2013.01); *G06F 9/5027* (2013.01)

(58) Field of Classification Search
CPC .................................................. G06F 9/45558
See application file for complete search history.

(56) References Cited

U.S. PATENT DOCUMENTS

| 10,425,230 B1* | 9/2019 | Tang et al. ............ H04L 9/3213 |
| 2017/0353309 A1 | 12/2017 | Gray |
| 2018/0060836 A1* | 3/2018 | Castagna ............... G06Q 20/10 |
| 2019/0379754 A1* | 12/2019 | Krishnaswamy ....... H04L 67/28 |

FOREIGN PATENT DOCUMENTS

| CN | 108734464 A | 11/2018 |
| CN | 109032706 A | 12/2018 |
| CN | 110096338 A | 8/2019 |
| CN | 110309024 A | 10/2019 |
| KR | 20190015287 A | 2/2019 |

OTHER PUBLICATIONS

Search Report for EP application 21179669.3 dated Dec. 1, 2021.
CN Office Action in Application 202010677698.6 dated Aug. 31, 2020.
KR Office Action in Application No. 10-2021-0045059 Dated Jun. 24, 2022.

* cited by examiner

*Primary Examiner* — James J Debrow
(74) *Attorney, Agent, or Firm* — Maschoff Brennan

(57) ABSTRACT

A method for implementing a smart contract based on a blockchain, a device, and a medium are provided. The detailed implementation includes: creating a resident process for a resident smart contract and creating a virtual machine by the resident process when achieving an enable condition of the resident smart contract; loading codes of the resident smart contract into a memory through the virtual machine; receiving a data access request generated by a normal smart contract within a block generation cycle through an across-contract calling interface of the virtual machine; and executing the resident smart contract through the virtual machine to process the data access request and returning a data access result to the normal smart contract.

18 Claims, 2 Drawing Sheets creating a resident process for a resident smart contract and creating a virtual machine by the resident process when achieving an enable condition of the resident smart contract — 110 loading codes of the resident smart contract into a memory through the virtual machine — 120 receiving a data access request generated by a normal smart contract within a block generation cycle through an across-contract calling interface of the virtual machine — 130 executing the resident smart contract through the virtual machine to process the data access request and returning a data access result to the normal smart contract — 140

METHOD FOR IMPLEMENTING SMART CONTRACT BASED ON BLOCKCHAIN

CROSS-REFERENCE TO RELATED APPLICATIONS

This application claims the benefit of priority to Chinese Application No. 202010677698.6, filed on Jul. 15, 2020, the contents of which are incorporated herein by reference in their entirety.

FIELD

Embodiments of the disclosure relate to a field of computer technologies, and particularly to a field of blockchain technologies.

BACKGROUND

A blockchain system may include a smart contract system. A main program of the blockchain system may implement various functions by calling a smart contract. A procedure of calling the smart contract by the main program of the blockchain system is similar to a common gateway interface (CGI) model employed by a WEB server to call an external program. In detail, within a life cycle during which the main program calls the smart contract, the smart contract has a complete data stream, referring to loading data from a disk, performing data calculation, and then writing a calculation result back to the disk. Data of the smart contract is cleared from a memory after the life cycle ends.

However, the above implementation of the smart contract is no longer suitable for an increasingly complex business requirement of the blockchain, and may cause a low data processing efficiency.

SUMMARY

Embodiments of the disclosure provide a method for implementing a smart contract based on a blockchain, a device, and a medium.

According to a first aspect of the disclosure, a method for implementing a smart contract based on a blockchain is provided. The method is applied to a blockchain node. The method includes: creating a resident process for a resident smart contract and creating a virtual machine by the resident process in response to achieving an enable condition of the resident smart contract; loading codes of the resident smart contract into a memory through the virtual machine; receiving a data access request generated by a normal smart contract within a block generation cycle through an across-contract calling interface of the virtual machine; and executing the resident smart contract through the virtual machine to process the data access request and returning a data access result to the normal smart contract. A life cycle of a process of the normal smart contract in the memory is one block generation cycle, and a life cycle of the resident process of the resident smart contract in the memory is greater than one block generation cycle.

According to another aspect of the disclosure, an electronic device is provided. The electronic device includes at least one processor and a memory. The memory is communicatively coupled to the at least one processor. The memory is configured to store instructions executable by the at least one processor. The at least one processor is caused to execute the method for implementing a smart contract based on a blockchain according to any of embodiments of the disclosure when the instructions are executed by the at least one processor.

According to another aspect of the disclosure, a non-transitory computer readable storage medium having computer instructions stored thereon is provided. The computer instructions are configured to cause a computer to execute the method for implementing a smart contract based on a blockchain according to any of embodiments of the disclosure.

It should be understood that, content described in the Summary is not intended to identify key or important features of embodiments of the disclosure, but not used to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Figure 1:
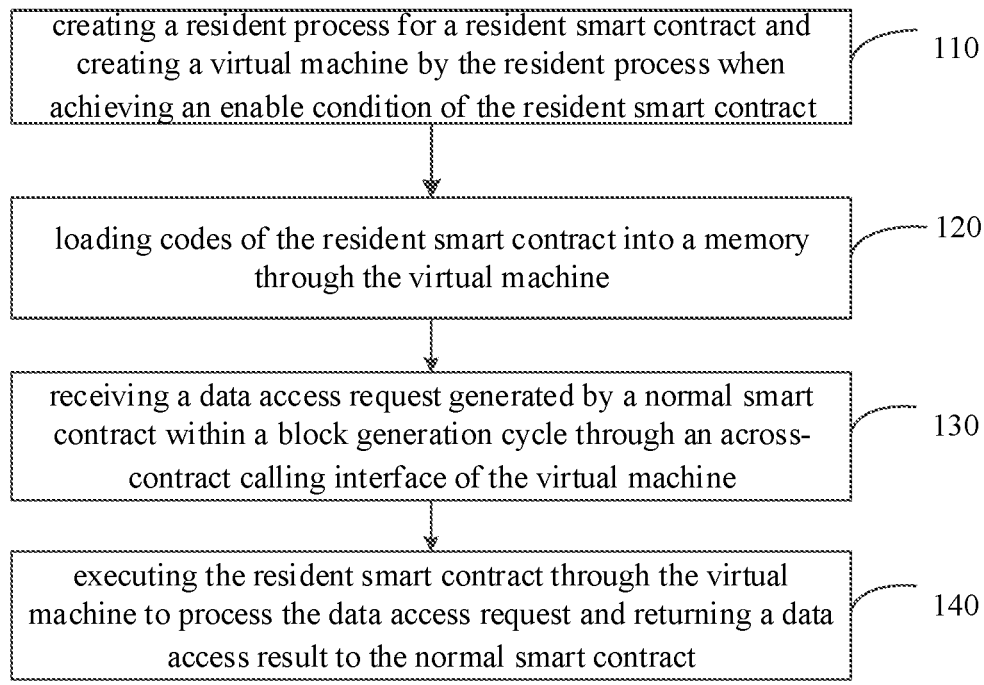
FIG. 1 is a flow chart illustrating a method for implementing a smart contract based on a blockchain according to an embodiment of the disclosure.

FIG. 1 is a flow chart illustrating a method for implementing a smart contract based on a blockchain according to an embodiment of the disclosure. The method is applicable to a situation where a smart contract is called to process block data during running of a blockchain system. The method may be executed by an apparatus for implementing a smart contract based on a blockchain. The apparatus may be implemented in the form of software and/or hardware. The apparatus may be integrated into an electronic device which may be configured as a blockchain node, that is, the method may be applied to the blockchain node and executed by the blockchain node. As illustrated in FIG. 1, the method includes the following.

At block S110, when an enable condition of the resident smart contract is achieved, a resident process is created for a resident smart contract, and a virtual machine is created through the resident process.

At block S120, codes of the resident smart contract are loaded into a memory through the virtual machine.

The smart contract refers to codes which may be running based on the virtual machine and complete a certain function during running. When the smart contract is called, a process may be created for the smart contract, and resources, such as a memory space, available for running may be allocated for the process. The virtual machine may be constructed in the process, and the codes of the smart contract may be loaded and executed based on the virtual machine.

The resident smart contract is a special smart contract compared with a normal smart contract (i.e., a common smart contract). A life cycle of a process of the normal smart contract in the memory is one block generation cycle. A life cycle of the resident process of the resident smart contract in the memory is greater than one block generation cycle.

The blockchain system sequentially processes transaction requests of a block based on the block generation cycle. The transaction request is a request carrying a business requirement of a user in the blockchain system. Generally, the transaction request may be implemented by calling at least one smart contract. At the start of a block generation cycle of a current block, a main program of the blockchain may call the smart contract based on the transaction request, and the normal smart contract is generally called during processing a transaction request in the current block within the block generation cycle of the current block, thereby completing a certain function in the transaction request. After the processing of the current block is completed, a function of the normal smart contract is also executed completely, the calling ends, and the main program notifies the normal smart contract to quit. Therefore, the life cycle of the process of the normal smart contract is one block generation cycle. The life cycle of the resident process of the resident smart contract in the memory is greater than one block generation cycle. In some embodiments, the resident process of the resident smart contract may continuously reside in the memory, which does not quit after being enabled during generation of a block, but may be called repeatedly during processing across blocks.

In this embodiment, in detail, the resident process is created for the resident smart contract and the virtual machine is created through the resident process, when the enable condition of the resident smart contract is achieved. There are multiple situations where the enable condition of the resident smart contract is achieved. The enable condition may refer to a condition of enabling/starting the resident smart contract. In some embodiments, the resident smart contract may be enabled based on at least one of following situation. The enable condition of the resident smart contract is achieved when the blockchain system is started at a local blockchain node. The enable condition of the resident smart contract is achieved when the resident smart contract is called for the first time.

In other words, running of one or more resident smart contracts may be started first when the local blockchain node having the blockchain system deployed thereon is started to run. This way is equivalent to preloading the resident smart contract and making preparations for subsequent calling of the resident smart contract, such that data accessing and data processing may be performed quickly by the resident smart contract when the calling is really needed.

The resident smart contract may also be enabled when the resident smart contract needs to be called for the first time. That is, the resident smart contract may be started as needed, and thereafter the resident smart contract may reside in the memory for the data accessing and the data processing in subsequent callings.

At block S130, a data access request generated by the normal smart contract within a block generation cycle is received through an across-contract calling interface of the virtual machine.

A function implemented by the resident smart contract generally needs data to be accessed high-frequently or to be processed across blocks. For example, a block count value and a transaction request count value need to be counted continuously. More computing resources may be cost when counting the values again every time a block is generated. Therefore, the counting may be performed by the resident smart contract. Other normal smart contracts of the current block may directly access the resident smart contract through the across-contract calling interface, and directly read data of the count values for use when the count values are required.

Of course, an access object of the data access request executed through the across-contract calling interface is not limited to the count value, and may alternatively include blockchain account information, the transaction request count value, a block count value, and across-block data, etc. The blockchain account information may be uniformly maintained and updated by a resident smart contract, and may be accessed and queried by the normal smart contract at any time. The across-block data is data generated by data processing based on data in different blocks. When the smart contract quits running within the generation cycle of one block, the across-block data may not be continuously calculated, and the historical data needs to be re-recorded and re-processed. However, the across-block data may be continuously processed and recorded by using the resident intelligent contract.

The data and function processed by the resident smart contract is not limited to those listed above, but may be set based on a detailed requirement.

The across-contract calling interface in embodiments may be specifically implemented based on an inter-process communication protocol. Therefore, interaction may be performed conveniently between processes of the smart contract. The across-contract calling interface may be implemented by a special calling model deployed in the blockchain system.

At block S140, the resident smart contract is executed through the virtual machine to process the data access request, and a data access result is returned to the normal smart contract.

In the technical solution of embodiments of the disclosure, by setting the resident smart contract, such special smart contract may reside in the memory and maintain running, such that accessing to the data to be high frequently accessed or the across-block data may realized at any time, without loading codes and data from the disk for recalculating. Therefore, the data processing speed is improved, and consumption of computation and reading/writing resources is reduced.

On the basis of the above embodiments, the method may also include: when a disable condition of the resident smart contract is achieved, solidifying data of the resident smart contract that is stored in the memory, writing the data into the disk, and killing the process and clearing the memory space allocated to the virtual machine of the resident smart contract.

The resident process of the resident smart contract may reside in the memory continuously, and does not need to be disabled and quitted by the main process with the end of the block generation cycle of the current block. For the resident smart contract, when the disable condition is achieved, data in the memory may be persistently stored in the disk but the process is killed (i.e., closed) and the memory space is cleared.

In detail, achieving the disable condition of the resident smart contract may include at least one of: achieving the disable condition of the resident smart contract when the blockchain system is turned off at the local blockchain node; and achieving the disable condition of the resident smart contract when a degradation requirement is generated for a running resource of the local blockchain node. The running resource includes a memory resource or a computing resource. The disable condition may refer to a condition of disabling/closing/quitting the resident smart contract.

The local blockchain node may quit the resident process of the resident smart contract when the local blockchain node is turned off or stops running. This way is equivalent to that the resident smart contract always exists during running of the node, which may continuously provide the data processing function. When the running resources of the node are limited, for example the degradation requirement is generated, the resident process may also be temporarily quitted. The degradation requirement of the running resources may occur when the concurrency of the transaction request suddenly increases or a device problem causes insufficient resources.

On the basis of the above embodiments, the resident smart contract may also implement a suspension function by setting the interface. The method may also include: when a suspension condition of the resident smart contract is achieved, reserving a process handle for the resident process, writing the data of the resident smart contract that is stored in the memory into a temporary storage area in the disk, and killing the process and clearing the memory space allocated to the virtual machine of the resident smart contract.

The suspension may generally be implemented when the node has insufficient running resources. When there is a small remaining memory space, or a lot of CPU computing resources are consumed, it may not be enough to support a large number of resident processes, then some or all resident processes may be suspended, and the resident processes may be reloaded into the memory when the running resources are sufficient.

In detail, it may be determined to perform suspension operation on at least one resident process based on a preset strategy when the suspension condition is achieved, for example the remaining amount of the running resources is lower than a preset lower limit. The preset strategy may refer to a priority preset for the resident process, or filtering based on a factor such as a calling frequency of the resident process. A preset number of resident processes may be suspended, or the resident processes may also be suspended in sequence until the running resources recover to a normal level. The suspension function of the resident process may effectively control an occupation of the running resources, thus giving consideration to an access service provided by the resident process for the high-frequency data and the occupation of the running resources.

The suspension of the resident process is to temporarily store the data of the resident process in the memory space into a temporary memory space allocated in the disk, thereby releasing the memory space and stopping external service of the resident process. The data is loaded from the temporary storage space to restore the resident process when the resident process needs to be restarted. The data in the temporary storage space may be cleared when the node fails and is turned off during a suspension stage.

Figure 2:
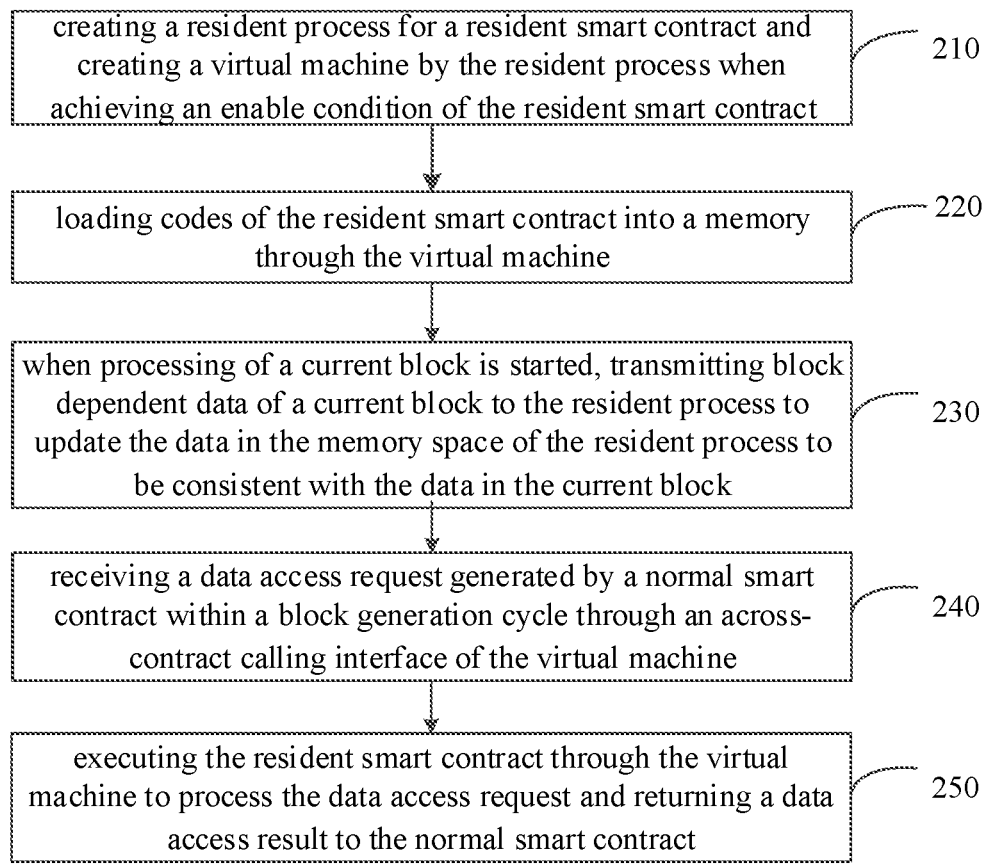
FIG. 2 is a flow chart illustrating a method for implementing a smart contract based on a blockchain according to another embodiment of the disclosure.

FIG. 2 is a flow chart illustrating a method for implementing a smart contract based on a blockchain according to another embodiment of the disclosure. This embodiment further describes a data update function of the resident smart contract on the basis of the above embodiments. As illustrated in FIG. 2, the method includes the following.

At block S210, a resident process is created for a resident smart contract and a virtual machine is created through the resident process when an enable condition of the resident smart contract is achieved.

At block S220, codes of the resident smart contract are loaded into a memory through the virtual machine.

At block S230, when processing in a current block is started, block dependent data of the current block is transmitted to the resident process to update the data of the resident process in the memory space to be consistent with the data in the current block.

After the resident process loads the resident smart contract, the resident process may not be started to load latest data of a block at the start of the block generation cycle like the normal smart contract since the resident process resides in the memory. The resident process may not be quitted at the end of the block generation cycle to update the processed data to the disk. Therefore, the resident smart contract needs a special data update mechanism, to enable that the data based on which the resident smart contract is running can be the data of the latest block in the current blockchain.

In some embodiments, the data update implemented in this embodiment may implement updating of memory data of the resident process at the start of a block generation cycle of a new block. When the block generation cycle of the new block starts, the main program of the blockchain system generally starts processing of the new block, and the corresponding normal smart contract and resident smart contract are called for the processing based on the transaction request currently obtained. The processing of the transaction request in the current block is generally performed based on data in a block generated previously. For example, when the transaction request in the current block is to access data of a certain account already recorded in a historical block, a reading operation needs to be performed on the account data in the historical block. When the transaction request in the current block is to perform a writing operation such as deleting, adding or modifying on certain data in the historical block, it is actually equivalent to recording the writing operation of historical data in the current block. The historical block data on which the reading operation and the writing operation depend is block dependent data of the current block. When the main program starts to load the normal smart contract, the block dependent data may be read from the historical block data recorded in the disk and loaded into the memory space of the normal smart contract for processing. For the resident process of the resident smart contract, the main program may transmit the block dependent data to the resident process of the resident smart contract when starting processing of the current block. The data that the resident smart contract depends on may be preset through an interface. For example, for the resident smart contract for block counting, the main process inputs latest block information into the resident smart contract through the calling interface when the main program calls the resident smart contract, such that the resident process may perform preprocessing. The resident process may process the data to be processed in the block information based on the function and parameter(s) defined by the resident smart contract, but ignore other data.

At block S240, a data access request generated by the normal smart contract within a block generation cycle is received through an across-contract calling interface of the virtual machine.

At block S250, the resident smart contract is executed through the virtual machine to process the data access request, and a data access result is returned to the normal smart contract.

A life cycle of a process of the normal smart contract in the memory is one block generation cycle, and a life cycle of the resident process of the resident smart contract in the memory is greater than one block generation cycle.

With the technical solution of this embodiment, when the current block is started for processing, the block dependent data is transmitted to the resident process, such that the resident process may maintain the data updated synchronously with the current block, thereby realizing correct data processing.

In addition, the data processed by the resident smart contract needs to be updated to the disk in time to maintain the block data in the disk in a latest state. On the one hand, the resident process may solidify and write the data in the memory space to the disk when the processing of the current block is completed. In detail, the main program may call the resident process and control the resident process to write the data updated within the block generation cycle of the current block to the disk when the processing of the current block is completed. On the other hand, in an actual operation, the resident smart contract is called as a function, a calling result may be returned to a processing process (such as a main program or a process of another smart contract), and then the processing process may be written into the current block together with current transaction data, that is, solidified into the disk space. When the main program calls the resident smart contract for preprocessing, and a preprocessing procedure returns a value, the main program may solidify and write a preprocessing result into the current block.

On the basis of the above technical solution, in order to maintain the data in the resident process be consistent with the block data, the resident process may be actively notified to perform data updating when the normal smart contract calls the resident smart contract. That is, while the data access request generated by the normal smart contract within the block generation cycle is received through the across-contract calling interface of the virtual machine, the method also includes: obtaining the block dependent data transmitted by the normal smart contract through the across-contract calling interface, and updating the block dependent data to the memory space of the resident process to maintain the data in the memory space of the resident smart contract be consistent with the data in the current block.

Based on the above solution, when the normal smart contract calls the resident smart contract, the data on which the running depends is actively transmitted to the resident process, to maintain the data in the memory space of the resident process be consistent with the data of the current block.

On the basis of the above technical solution, further consideration may be given to a block rollback event to maintain the data in the memory space of the resident process be consistent with the data of the current block. The block rollback means that last one or more blocks (which can be called as "rollback block") recorded on-chain in the blockchain nodes fail due to various reasons, and need to be removed from the blockchain. The block rollback is not just to delete the block directly, but to reversely perform respective transaction requests from back to front, such that data change brought by the transaction requests of the block is cancelled, and then a transaction request of a new valid block is executed.

For the normal smart contract, when the block rollback event occurs, the normal smart contract may quit, and wait to be started again under the control of the main program. The resident smart contract may also complete the block rollback based on block data in the disk by quitting the resident process and re-creating a resident process. However, in order to avoid repeatedly quitting and re-creating the resident process, the rollback of the data in the memory space of the resident process is completed preferably in the following way. That is, the method further includes: when a block rollback event occurs, notifying the resident process by the main program of the blockchain system to perform rollback operation based on at least one transaction request of a rollback block to update the data in the memory space of the resident smart contract;

In the above solution, the resident process is kept alive, and based on a reverse rollback operation of respective transaction requests, the main program notifies the data updated by the rollback operation to the resident process, such that the resident process may update the data in the memory space.

The method may also include: when the block rollback event occurs, notifying the resident process to be closed and restarted by the main program of the blockchain system, to reload rolled-back block data from the disk. In this way, a high performance is required to implement repeated reuse of data.

According to the technical solution of embodiments of the disclosure, a resident smart contract is provided. In essence, the resident smart contract may be loaded into a memory and run through a virtual machine that is not turned off. An interface of the virtual machine of the resident smart contract may mainly include a starting interface, a loading process, a calling interface, a closing interface, a suspending interface, and a block walk support interface.

The starting interface is configured to create a new resident process and to start the virtual machine. The virtual machine may provide an IPC (inter-process communication) capability to outside.

The loading process is configured to load bytecodes of the resident smart contract into a virtual machine of a newly started resident process.

The calling interface is configured to receive an across-contract call, and is an interface for the main program, the normal smart contract and other programs to access the resident smart contract.

The closing interface is configured to close the resident process, that is, to recycle resources, serialize data to the disk, and then to close the resident process.

The suspending interface is configured to suspend the resident process, that is, to maintain the process handle, to vacate running resources by a system call, and to stop external service of the resident smart contract.

The block walk support interface is configured to receive data of a latest block and update data in the memory space to the latest block.

The above interface may be realized by WASM, and a process of the WASM may be maintained independently. In this way, an independent process may always maintain the data in a valid state until the virtual machine is destroyed.

Figure 3:
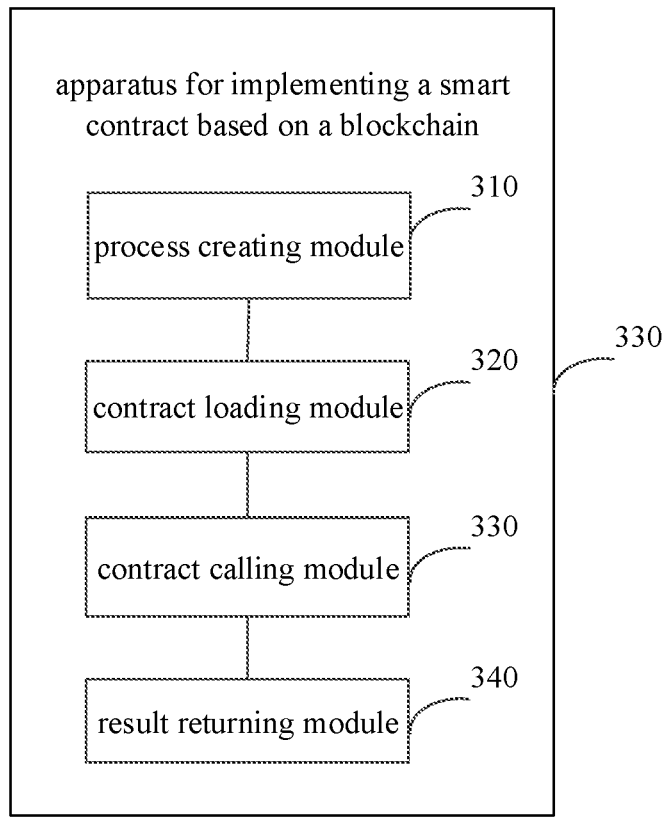
FIG. 3 is a block diagram illustrating an apparatus for implementing a smart contract based on a blockchain according to embodiments of the disclosure.

FIG. 3 is a block diagram illustrating an apparatus 300 for implementing a smart contract based on a blockchain according to an embodiment of the disclosure. The apparatus 300 is configured in a blockchain node. The apparatus includes: a process creating module 310, a contract loading module 320, a contract calling module 330, and a result returning module 340.

The process creating module 310 is configured to create a resident process for a resident smart contract, and to create a virtual machine by the resident process when an enable condition of the resident smart contract is achieved. The contract loading module 320 is configured to load codes of the resident smart contract into a memory through the virtual machine. The contract calling module 330 is configured to receive a data access request generated by a normal smart contract within a block generation cycle through an across-contract calling interface of the virtual machine. The result returning module 340 is configured to execute the resident smart contract through the virtual machine to process the data access request, and to return a data access result to the normal smart contract. A life cycle of a process of the normal smart contract in the memory is one block generation cycle, and a life cycle of the resident process of the resident smart contract in the memory is greater than one block generation cycle.

In the technical solution of embodiments of the disclosure, by setting the resident smart contract, such special smart contract may reside in the memory and maintain running, such that accessing to the data to be high frequently accessed or the across-block data may be realized at any time, without loading codes and data from the disk for recalculating. Therefore, the data processing speed is improved, and consumption of computation and reading/writing resources is reduced.

In some embodiments, achieving the enable condition of the resident smart contract includes at least one of: achieving the enable condition of the resident smart contract when a blockchain system is started at a local blockchain node; and achieving the enable condition of the resident smart contract when the resident smart contract is called for the first time.

In some embodiments, the apparatus further includes a process closing module, configured to, when a disable condition of the resident smart contract is achieved, solidify data stored by the resident smart contract in the memory, to write the data into a disk, and to kill a process and clear a memory space allocated to the virtual machine of the resident smart contract.

In some embodiments, achieving the disable condition of the resident smart contract includes at least one of: achieving the disable condition of the resident smart contract when the blockchain system is closed at the local blockchain node; and achieving the turning-off condition of the resident smart contract when a degradation requirement is generated for a running resource of the local blockchain node. The running resource includes a memory resource or a computing resource.

In some embodiments, the apparatus further includes: a process suspending module, configured to reserve a process handle for the resident process, to write the data stored by the resident smart contract in the memory into a temporary storage area in the disk, and to kill the process and clear the memory space allocated to the virtual machine of the resident smart contract when a suspension condition of the resident smart contract is achieved.

In some embodiments, the across-contract calling interface is implemented based on an inter-process communication protocol.

In some embodiments, the apparatus further includes: a first data updating module, configured to transmit block dependent data of a current block to the resident process to update the data in the memory space of the resident process to be consistent with the data in the current block when processing of the current block is started.

In some embodiments, the apparatus further includes: a second data updating module, configured to obtain block dependent data transmitted by the normal smart contract through the across-contract calling interface, and to update the block dependent data to the memory space of the resident process to maintain the data in the memory space of the resident smart contract be consistent with the data in the current block while receiving the data access request generated by the normal smart contract within the block generation cycle through the across-contract calling interface of the virtual machine.

In some embodiments, an access object of the data access request includes blockchain account information, a transaction request count value, a block count value, and across-block data.

In some embodiments, the apparatus further includes: a first rollback module and a second rollback module.

The first rollback module is configured to notify the resident process by a main program of the blockchain system to perform a rollback operation based on at least one transaction request of a rollback block to update the data in the memory space of the resident smart contract when a block rollback event occurs. Alternatively, the second rollback module is configured to notify, by the main program of the blockchain system, the resident process to be closed and restarted to reload rolled-back block data from the disk when a block rollback event occurs.

According to embodiments of the disclosure, the disclosure also provides an electronic device and a readable storage medium.

Figure 4:
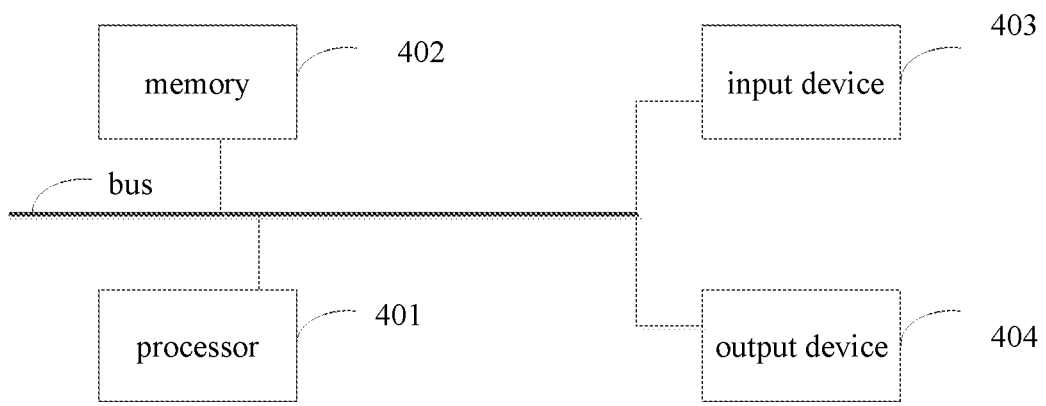
FIG. 4 is a block diagram illustrating an electronic device capable of implementing a method for implementing a smart contract based on a blockchain according to an embodiment of the disclosure.

As illustrated in FIG. 4, FIG. 4 is a block diagram illustrating an electronic device capable of implementing a method for implementing a smart contract of a blockchain according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device.

The components, connections and relationships of the components, and functions of the components illustrated herein are merely examples, and are not intended to limit the implementation of the disclosure described and/or claimed herein.

As illustrated in FIG. 4, the electronic device includes: one or more processors 401, a memory 402, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 4, a processor 401 is taken as an example.

The memory 402 is a non-transitory computer readable storage medium provided by the disclosure. The memory is configured to store instructions executable by at least one processor, to enable the at least one processor to execute the method for implementing the smart contract of the blockchain provided by the disclosure. The non-transitory computer readable storage medium provided by the disclosure is configured to store computer instructions. The computer instructions are configured to enable a computer to execute the method for implementing the smart contract of the blockchain provided by the disclosure.

As the non-transitory computer readable storage medium, the memory 402 may be configured to store non-transitory software programs, non-transitory computer executable programs and modules, such as program instructions/module (such as the process creating module 310, the contract loading module 320, the contract calling module 330, and the result returning module 340 illustrated in FIG. 3) corresponding to the method for implementing the smart contract of the blockchain according to embodiments of the disclosure. The processor 401 is configured to execute various functional applications and data processing of the server by operating non-transitory software programs, instructions and modules stored in the memory 402, that is, implements the method for implementing the smart contract of the blockchain according to the above method embodiments.

The memory 402 may include a storage program region and a storage data region. The storage program region may store an application required by an operating system and at least one function. The storage data region may store data created according to predicted usage of the electronic device based on the semantic representation. In addition, the memory 402 may include a high-speed random accessing memory, and may also include a non-transitory memory, such as at least one disk memory device, a flash memory device, or other non-transitory solid-state memory device. In some embodiments, the memory 402 may optionally include memories remotely located to the processor 401, and these remote memories may be connected to the electronic device via a network. Examples of the above network include, but are not limited to, an Internet, an intranet, a local area network, a mobile communication network and combinations thereof.

The electronic device capable of implementing the method for implementing the smart contract of the blockchain may also include: an input device 403 and an output device 404. The processor 401, the memory 402, the input device 403, and the output device 404 may be connected via a bus or in other means. In FIG. 4, the bus is taken as an example.

The input device 403 may receive inputted digital or character information, and generate key signal input related to user setting and function control of the electronic device capable of implementing the method for implementing the smart contract of the blockchain, such as a touch screen, a keypad, a mouse, a track pad, a touch pad, an indicator stick, one or more mouse buttons, a trackball, a joystick and other input device. The output device 404 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

According to the technical solution of embodiments of the disclosure, by setting the resident smart contract, the special smart contract may be resident in the memory to maintain running, and may provide accessing to the high-frequency accessing data or the cross-block data at any time, without loading codes and data from the disk for recalculating. Therefore, the data processing speed is improved, and consumption of computation and reading and writing resources is reduced.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for implementing a smart contract based on a blockchain, applied to a blockchain node, and comprising:
   creating a resident process for a resident smart contract and creating a virtual machine by the resident process in response to achieving an enable condition of the resident smart contract;
   loading codes of the resident smart contract into a memory through the virtual machine;
   receiving a data access request generated by a normal smart contract within a block generation cycle through an across-contract calling interface of the virtual machine;
   executing the resident smart contract through the virtual machine to process the data access request and returning a data access result to the normal smart contract; and
   in response to achieving a disable condition of the resident smart contract, solidifying data stored by the resident smart contract in the memory, writing the data into a disk, and killing a process allocated to the virtual machine and clearing a memory space allocated to the virtual machine of the resident smart contract;
   wherein a life cycle of a process of the normal smart contract in the memory is one block generation cycle, and a life cycle of the resident process of the resident smart contract in the memory is greater than one block generation cycle.

2. The method of claim 1, wherein achieving the enable condition of the resident smart contract comprises at least one of:
   achieving the enable condition of the resident smart contract when a blockchain system is started at a local blockchain node; and
   achieving the enable condition of the resident smart contract when the resident smart contract is called for the first time.

3. The method of claim 1, wherein achieving the disable condition of the resident smart contract comprises at least one of:
   achieving the disable condition of the resident smart contract when a blockchain system is turned off at a local blockchain node; and
   achieving the disable condition of the resident smart contract when a degradation requirement is generated for a running resource of the local blockchain node, wherein the running resource comprises at least one of a memory resource and a computing resource.

4. The method of claim 1, further comprising:
   in response to achieving a suspension condition of the resident smart contract, reserving a process handle for the resident process, writing data stored by the resident smart contract in the memory into a temporary storage area in the disk, and killing a process allocated to the virtual machine and clearing a memory space allocated to the virtual machine of the resident smart contract.

5. The method of claim 1, wherein the across-contract calling interface is implemented based on an inter-process communication protocol.

6. The method of claim 1, further comprising:
   in response to starting processing of a current block, transmitting block dependent data of the current block to the resident process to update data in a memory space of the resident process to be consistent with data in the current block.

7. The method of claim 1, further comprising:
   obtaining block dependent data transmitted by the normal smart contract through the across-contract calling interface, and updating the block dependent data to a memory space of the resident process to maintain data in the memory space of the resident smart contract be consistent with data in the current block.

8. The method of claim 1, wherein an access object of the data access request comprises blockchain account information, a transaction request count value, a block count value, and across-block data.

9. The method of claim 1, further comprising one of following:
   in response to occurring a block rollback event, notifying the resident process by a main program of a blockchain system to perform a rollback operation based on at least one transaction request of a rollback block to update data in a memory space of the resident intelligent contract; and
   in response to occurring a block rollback event, notifying, by the main program of the blockchain system, the resident process to be closed and restarted, to reload rolled-back block data from a disk.

10. An electronic device, comprising:
    at least one processor; and
    a memory, communicatively coupled to the at least one processor,
    wherein the memory is configured to store instructions executable by the at least one processor, and when the instructions are executed by the at least one processor, the at least one processor is caused to execute the method for implementing a smart contract based on a blockchain comprising:
    creating a resident process for a resident smart contract and creating a virtual machine by the resident process in response to achieving an enable condition of the resident smart contract;
    loading codes of the resident smart contract into a memory through the virtual machine;

receiving a data access request generated by a normal smart contract within a block generation cycle through an across-contract calling interface of the virtual machine; and executing the resident smart contract through the virtual machine to process the data access request and returning a data access result to the normal smart contract; and in response to achieving a disable condition of the resident smart contract, solidifying data stored by the resident smart contract in the memory, writing the data into a disk, and killing a process allocated to the virtual machine and clearing a memory space allocated to the virtual machine of the resident smart contract, wherein a life cycle of a process of the normal smart contract in the memory is one block generation cycle, and a life cycle of the resident process of the resident smart contract in the memory is greater than one block generation cycle.

11. The electronic device of claim 10, wherein achieving the enable condition of the resident smart contract comprises at least one of:

achieving the enable condition of the resident smart contract when a blockchain system is started at a local blockchain node; and achieving the enable condition of the resident smart contract when the resident smart contract is called for the first time.

12. The electronic device of claim 10, wherein achieving the disable condition of the resident smart contract comprises at least one of:

achieving the disable condition of the resident smart contract when a blockchain system is turned off at a local blockchain node; and achieving the disable condition of the resident smart contract when a degradation requirement is generated for a running resource of the local blockchain node, wherein the running resource comprises a memory resource or a computing resource.

13. The electronic device of claim 10, wherein the method further comprises:

in response to achieving a suspension condition of the resident smart contract, reserving a process handle for the resident process, writing data stored by the resident smart contract in the memory into a temporary storage area in the disk, and killing a process allocated to the virtual machine and clearing a memory space allocated to the virtual machine of the resident smart contract.

14. The electronic device of claim 10, wherein the across-contract calling interface is implemented based on an inter-process communication protocol.

15. The electronic device of claim 10, wherein the method further comprises:

in response to starting processing of a current block, transmitting block dependent data of the current block to the resident process to update data in a memory space of the resident process to be consistent with data in the current block.

16. The electronic device of claim 10, wherein the method further comprises:

obtaining block dependent data transmitted by the normal smart contract through the across-contract calling interface, and updating the block dependent data to a memory space of the resident process to maintain data in the memory space of the resident smart contract be consistent with data in the current block.

17. The electronic device of claim 10, wherein the method further comprises:

in response to occurring a block rollback event, notifying the resident process by a main program of a blockchain system to perform a rollback operation based on at least one transaction request of a rollback block to update data in a memory space of the resident intelligent contract; or in response to occurring a block rollback event, notifying, by the main program of the blockchain system, the resident process to be closed and restarted, to reload rolled-back block data from a disk.

18. A non-transitory computer readable storage medium having computer instructions stored thereon, wherein the computer instructions are configured to cause a computer to execute the method for implementing a smart contract based on a blockchain comprising:

creating a resident process for a resident smart contract and creating a virtual machine by the resident process in response to achieving an enable condition of the resident smart contract;

loading codes of the resident smart contract into a memory through the virtual machine;

receiving a data access request generated by a normal smart contract within a block generation cycle through an across-contract calling interface of the virtual machine; and executing the resident smart contract through the virtual machine to process the data access request and returning a data access result to the normal smart contract; and in response to achieving a disable condition of the resident smart contract, solidifying data stored by the resident smart contract in the memory, writing the data into a disk, and killing a process allocated to the virtual machine and clearing a memory space allocated to the virtual machine of the resident smart contract;

wherein a life cycle of a process of the normal smart contract in the memory is one block generation cycle, and a life cycle of the resident process of the resident smart contract in the memory is greater than one block generation cycle.

* * * * *